United States Patent Office 3,535,023
Patented Oct. 20, 1970

3,535,023
PIPE LENS HAVING AN INNER
SURFACE OF REVOLUTION
Tatsuo Yamanaka, Tokorozawa-shi, and Hisao Azuma,
Mitaka-shi, Japan, assignors to The Director of National Aerospace Laboratory of Science and Technology Agency, Akiyoshi Matsuura, Tokyo, Japan, an
authority of the Japanese Government
Filed Feb. 15, 1968, Ser. No. 705,669
Claims priority, application Japan, July 15, 1967,
42/45,581
Int. Cl. G02b 3/02
U.S. Cl. 350—189                                    3 Claims

ABSTRACT OF THE DISCLOSURE

A pipe lens is provided whereby phenomena within the pipe lens may be optically observed. The pipe lens is provided with an inner surface of revolution which is bell-shaped. The outer surface of the lens is so related to the inner surface that parallel light rays entering the lens, pass through the two walls of the lens, and emerge from the lens parallel to the incoming light rays.

---

This invention relates to a pipe type lens through which phenomena in the pipe can be optically observed, where the pipe has a surface of revolution and is called hereafter "bell shaped pipe," and the lens also is called hereafter "bell shaped pipe lens." In a special case of the "bell shaped pipe lens," when the inner surface is conical or cylindrical, the lens may be called "conical pipe lens" or "cylindrical pipe lens," respectively.

When the state of fluid in the test section of a circular wind tunnel is required to be optically observed, the projected parallel light rays will be refracted and dispersed, as hereinafter described, and will not emerge parallel, even if transparent material is used for the pipe wall. The pattern of dispersion depends on both of the thickness of the wall and the shape of pipe. The thicker wall disperses the more and the thinner does the less. As far as there exists pipe wall, the incoming parallel light rays do not become parallel any more when transversing the inner pipe and do not emerge parallel so that the Schlieren method for optical observation is impossible in this case. The shadow method may be possible in principle, however, it will be very difficult to take the photographs for subjecting exact analysis because the distortion is too complicated to be calibrated. The optical observation of phenomena in the conical pipe will be more difficult than the previous case because of its cone angle, and in the case of "bell shaped pipe," it will be much more difficult than the former two, because the axial curvature of the inner surface is a function of axial distance and the projected image is related also to the axial curvature of the inner surface.

The present invention eliminates the difficulties caused from the ordinary transparent bell shaped, or conical, or cylindrical pipe upon observing optically phenomena in the pipe and present the parallel projected image which can be well subjected for exact analysis.

The present invention provides a pipe lens comprising an inner surface of revolution and an outer surface having the specific relationship to the inner surface.

The present invention will now be described in detail referring to the embodiments shown in the attached drawing, in which:

FIG. 1 shows the refraction and dispersion of the light rays projected parallel into the transparent circular pipe. As shown in FIG. 1, the projected light rays will be refracted and be dispersed and will not emerge parallel even if the transparent material is used for the pipe wall.

Figure 1:
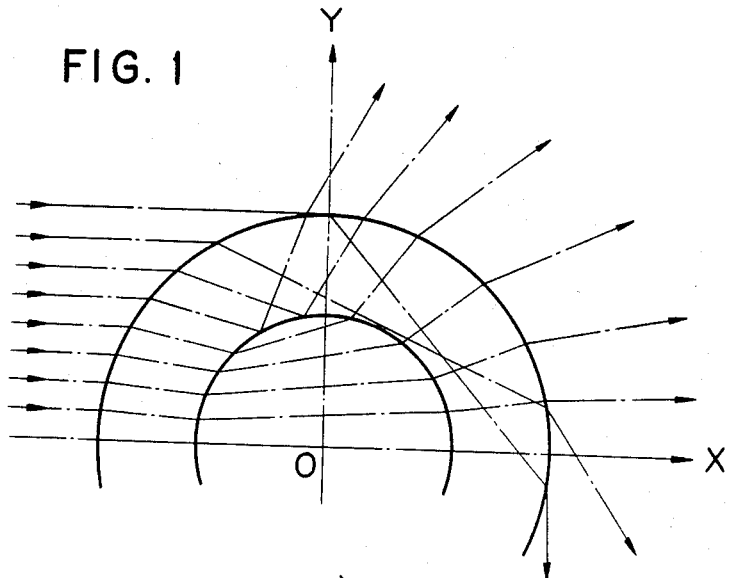
FIG. 1 shows the dispersion of incoming parallel light rays passing through a transparent circular pipe of thick wall.
Figure 2:
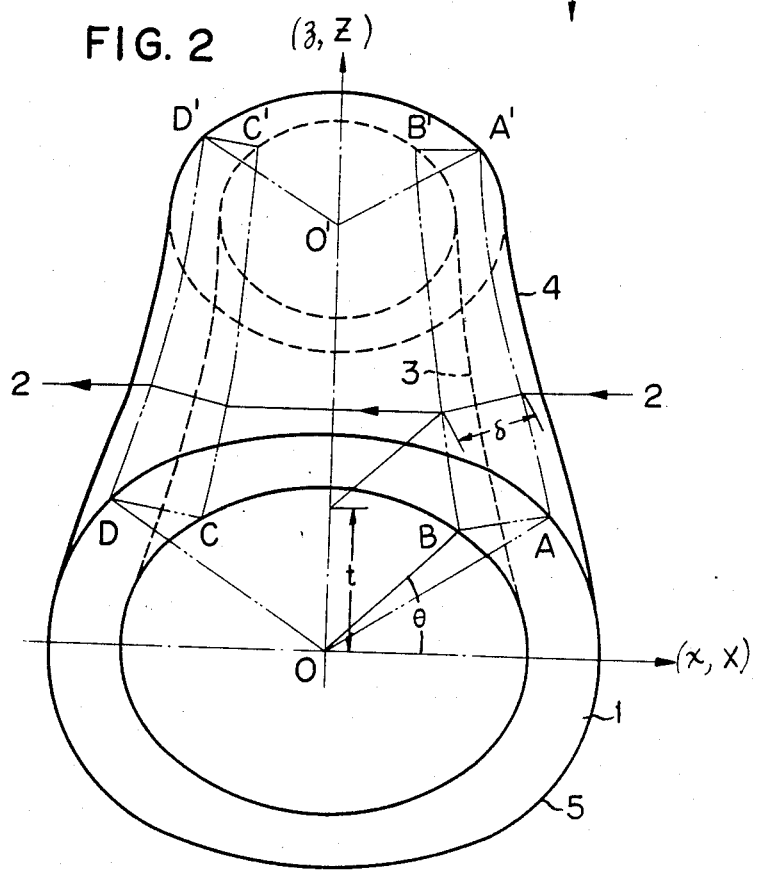
FIG. 2 shows a generic embodiment of the lens of the present invention where the pattern of the light rays passing through the lens is shown.
Figure 3:
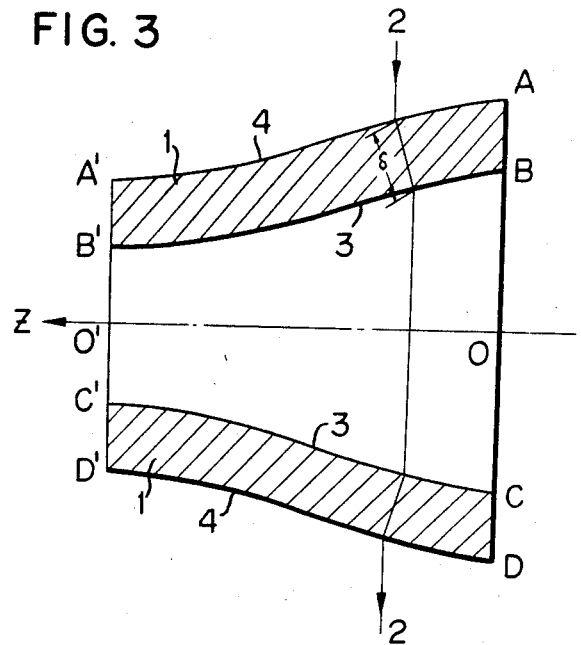
FIG. 3 is a longitudinal cross section which traverses the pipe axis of the lens shown in FIG. 2.
Figure 4:
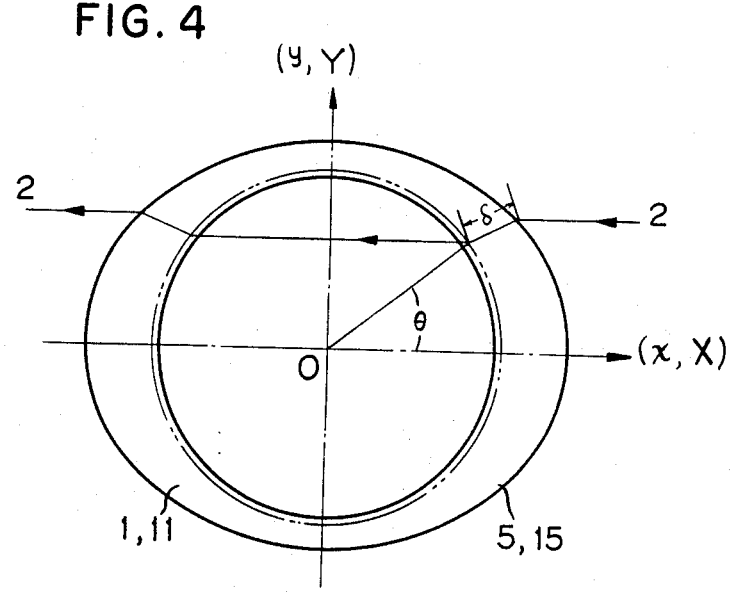
FIG. 4 is a transverse cross section perpendicular to the pipe axis of the lens of the present invention.
Figure 5:
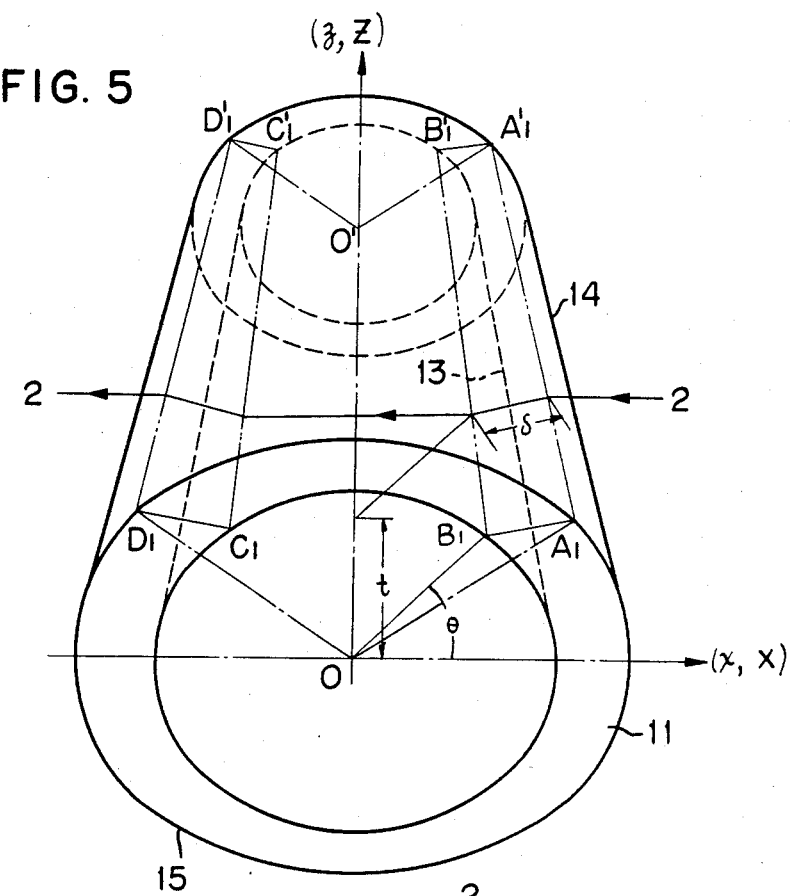
FIG. 5 shows a specific embodiment, i.e. a conical lens having the conical inner surface, of the present invention where the pattern of light rays through the lens is shown.
Figure 6:
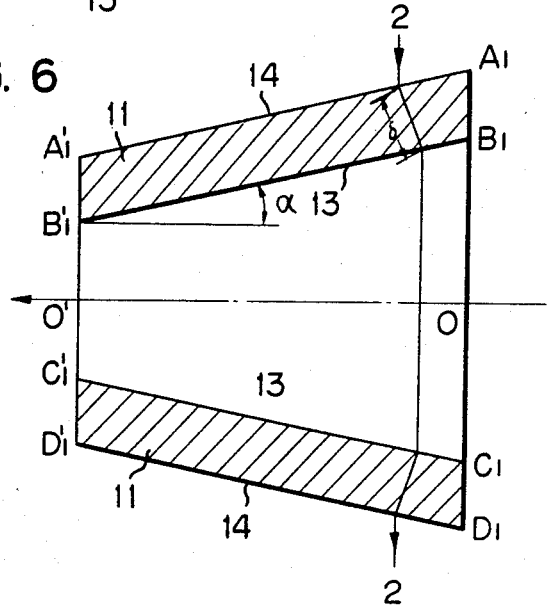
FIG. 6 is a longitudinal cross section which traverses the pipe axis of the conical lens shown in FIG. 5.

However, in accordance with the present invention, such defect has been overcome and the incoming parallel light rays will be outgoing in parallel through the pipe lens. The structures and the performance of the present invention are explained referring to the embodiments of FIGS. 2 through 6.

In these figures, 1 is the lens wall made of transparent material, 2 shows the path of a light ray parallel to X-axis, 3 is the inner surface of revolution, 4 is the outer surface of the lens, and 5 is the closed cross sectional curve of the outer surface 4 on a cross section perpendicular to the axis O–Z. When the inner surface is a conical one 13 (FIGS. 5 and 6) or a cylindrical one, the outer surface 14 of the conical or the cylindrical lens becomes a ruled surface whose generating lines are parallel to the ones of the inner surface; and 15 shows the closed curve through which the generating lines of the outer surface 14 pass, and which is also the outer curve of the cross section perpendicular to the axis of the conical or the cylindrical lens; 11 shows the pipe wall of this conical or cylindrical lens, and $\alpha$ represents the cone half angle.

The incoming light raps refract twice at the outer surface 4 and the inner surface 3, cancelling the refraction of each other to pass through the bore of the lens parallel to the incoming light rays, and then refract again twice at the inner surface 3 and the outer surface 4, cancelling the refraction to each other so as to emerge from the lens parallel to the incoming light rays.

The bell shaped pipe lens of the present invention has such an outer surface that the incoming parallel light rays 2 along the X-axis are refracted twice on the outer surface 4 and the inner surface 3, respectively, traverse through the bore defined by the inner surface and parallel to the X-axis, and also emerge parallel to the X-axis after refraction twice on the opposite inner surface 3 and the outer surface 4, respectively.

When using small letters of $\xi$, and x, y, z to express the position vector and rectangular coordinates of the inner surface, respectively; capital letters of $\Xi$ and X, Y, Z to express those of the outer surface; O to express the point Z=O on the axis, then the inner surface and the outer surface of the bell shaped pipe lens of the present invention are defined by the equations described hereinafter. It is added that there is no rotation between the two rectangular coordinates.

INNER SURFACE $\xi(x, y, z)$:

$$x = f(t) \cos \theta$$
$$y = f(t) \sin \theta \qquad (1)$$
$$z = t$$

OUTER SURFACE

Position vector expression:

$$\Xi(\theta, t) = \xi(\theta, t) + \delta(\theta, t) \cdot \gamma_1(\theta, t) \qquad (2)$$

If this is expressed by the rectangular coordinates, then:

$$X(\theta, t) = f(t) \cos \theta + \delta(\theta, t) \cdot l(\theta, t)$$
$$Y(\theta, t) = f(t) \sin \theta + \delta(\theta, t) \cdot m(\theta, t) \qquad (2')$$
$$Z(\theta, t) = t + \delta(\theta, t) \cdot n(\theta, t)$$

where $f(t)$ expresses the inner radius at $z=t$ on the cross section perpendicular to the axis and is a continuous function of $t$; $\theta$ and $t$ are curvilinear coordinates of the inner surface, $\theta$ being the radial angle and $t$ the distance on the Z-axis of the inner surface. The thickness of the lens wall, calculated from equation (1), (2) and (2'), will decrease as $\theta$ increases from 0 to 90°.

When the inner surface is a conical one 13, $f(t)$ is expressed as a linear function of $t$ as, $$f(t) = r_0 - t \cdot \tan \alpha \qquad (1\text{-}a)$$

where $r_0$ expresses the inner radius at $z=0$.

When $\alpha=0$, $f(t)$ becomes constant and Eq. (1) expresses a cylindrical surface. The vector $\gamma_1'$ is a unit vector which expresses the light path passing through the wall after the refraction at the inner surface, and has the following components:

$\gamma_1'(l, m, n)$:

$$l = \frac{\cos \theta \cdot \cos \theta_B + \sin \theta_B (\dot{f}(t)^2 + \sin^2 \theta)^{1/2}}{(1 + \dot{f}(t)^2)^{1/2}}$$

$$m = \frac{(\dot{f}(t)^2 + \sin^2 \theta)^{1/2} \cos \theta_B - \cos \theta \cdot \sin \theta_B}{\{(1+\dot{f}(t)^2) \cdot (\dot{f}(t)^2 + \sin^2 \theta)\}^{1/2}} \sin \theta$$

$$n = -\frac{\dot{f}(t)^2 + \sin^2 \theta)^{1/2} \cos \theta_B - \cos \theta \cdot \sin \theta_B}{\{(+\dot{f}(t)^2) \cdot (\dot{f}(t)^2 + \sin^2 \theta)\}^{1/2}} \cdot \dot{f}(t)$$

$$(3)$$

and $\theta_B = \arccos \left[ \frac{1}{n_\lambda} \left\{ \frac{(n\lambda^2 - 1)(1 + \dot{f}(t)^2) + \cos^2 \theta}{1 + \dot{f}(t)^2} \right\}^{1/2} \right]$ $$(4)$$

where $n_\lambda$ expresses the refractive index of the transparent material for the light wave length $\lambda$ and $\dot{f}(t)$ denotes $df/dt$; $\delta(\theta, t)$ expresses a distance of the refracted light ray path of the vector $\gamma_1'$ between the inner and the outer surface and is given by the solution of the following simultaneous partial differential equations.

$$\frac{\partial \delta}{\partial \theta} = -\delta \frac{[\xi]_N \cdot \frac{\partial \gamma_1}{\partial \theta}}{[\xi]_N \cdot \gamma_1}$$

$$\frac{\partial \delta}{\partial t} = -\delta \frac{[\xi]_N \cdot \frac{\partial \gamma_1}{\partial t}}{[\xi]_N \cdot \gamma_1}$$

$$0 \leq \theta \leq \frac{\pi}{2}$$

$$(5)$$

The solution of Equation (5) may be given as an exact one or as an approximate one. The numerical integration is needed, any way, and the error must be within an allowable lens dispersion limit.

$[\xi]_N$ expresses a normal unit vector of the inner surface $\xi$ and is given by the following vector components:

$$[\xi]_n : \begin{cases} \dfrac{\cos \theta}{(1+\dot{f}(t)^2)^{1/2}} \\ \dfrac{\sin \theta}{(1-\dot{f}(t)^2)^{1/2}} \\ \dfrac{-\dot{f}(t)}{(1+\dot{f}(t)^2)^{1/2}} \end{cases}$$

$$(6)$$

It is noted that Equation (2) or (2') is defined only in the region of $0 \leq \Theta \leq \pi/2$ and the surface is only a quarter of the whole outer surface of the lens, and the symmetrically projected surface twice to the X–Z and the Y–Z planes is the required outer surface of the "bell shaped pipe lens."

The outer surface expressed by Equation (2) or (2') in association with other Equations (1), (3), (4), (5) and (6) is sometimes very difficult to generate by machining and polishing in application for a given arbitrary continuous function of $f(t)$. When the inner surface is given by, Eqs. (1) and (1-a), i.e. conical surface 13 or cylindrical one, the outer surface 14 of the conical or cylindrical pipe lens has the exact solution of equation 5 and becomes simple because of the ruled surface whose generating lines are parallel to the ones of the inner surface. The outer surface 14 of the conical or cylindrical pipe lens is thus expressed by the following, rectangular coordinates:

$$X = (r_0 - t \cdot \tan \alpha) \cos \theta + \delta(\theta) \cdot l(\theta)$$
$$Y = (r_0 - t \cdot \tan \alpha) \sin \theta + \delta(\theta) \cdot m(\theta) \qquad (2'\text{-}a)$$
$$Z = t + \delta(\theta) \cdot n(\theta)$$

where above described Equations 3, 4 and 5 can be expressed only by $\theta$ as:

$$\begin{cases} l = \cos \alpha \cos \theta \cos \theta_B \\ \qquad + (1 - \cos^2 \alpha \cos^2 \theta) \left\{ \dfrac{1 - \cos^2 \theta_B}{1 - \cos^2 \alpha \cos^2 \theta} \right\}^{1/2} \\ m = \cos^2 \alpha \sin \theta \cos \theta \left[ \dfrac{\cos \theta_B}{\cos \alpha \cos \theta} - \left\{ \dfrac{1 - \cos^2 \theta_B}{1 - \cos^2 \alpha \cos^2 \theta} \right\}^{1/2} \right] \\ n = \sin \alpha \cos \alpha \cos \theta \left[ \dfrac{\cos \theta_B}{\cos \alpha \cos \theta} - \left\{ \dfrac{1 - \cos^2 \theta_B}{1 - \cos^2 \alpha \cos^2 \theta} \right\}^{1/2} \right] \end{cases}$$

$$(3\text{-}a)$$

and $$\theta_B = \arccos \left\{ \frac{1}{n\lambda} (n\lambda^2 - 1 + \cos^2 \alpha \cos^2 \theta)^{1/2} \right\} \qquad (4\text{-}a)$$

$$\frac{\delta}{\delta_0} = \frac{l_0 + n_0 \tan \alpha}{l \cos \theta + m \sin \theta + n \tan \alpha} \exp \left\{ -\int_0^\theta \frac{l \sin \theta - m \cos \theta}{l \cos \theta + m \sin \theta + n \tan \alpha} d\theta \right\}$$

$$(5\text{-}a)$$

$$\left( 0 \leq \theta \leq \frac{\pi}{2} \right)$$

where $\delta_0$ is a given value at $\theta = 0$ in view of strength of pipe wall; and $l_0$ and $n_0$ are the values of $l$ and $n$ at $\theta = 0$, respectively, i.e., $$l_0 = \frac{\sin^2 \alpha}{n\lambda} + \cos \alpha \left( 1 - \frac{\sin^2 \alpha}{n\lambda^2} \right)^{1/2}$$

$$n_0 = \sin \alpha \left\{ \left( 1 - \frac{\sin^2 \alpha}{n\lambda^2} \right)^{1/2} - \frac{\cos \alpha}{n\lambda} \right\} \qquad (5'\text{-}a)$$

Taking $t = Z_0 - \delta \cdot n$, equation (2'-a) can be reduced to $$X = (r_0 - Z_0 \cdot \tan \alpha) \cos \theta + (l + n \cdot \tan \alpha \cos \theta) \delta$$
$$Y = (r_0 - Z_0 \cdot \tan \alpha) \sin \theta + (m + n \cdot \tan \alpha \sin \theta) \delta$$

$$(7)$$

Integrating Eq. 5-a from $\theta=0$ to $\theta=\pi/2$, Eq. 7 gives a quarter curve of the closed one at the first quadrant of X-Y plane at $Z=Z_0$. If this quarter curve is symmetrically projected twice around X-axis and Y-axis, respectively, the resulting closed curve is the outer one 15 of the cross section at $Z=Z_0$ for the required conical lens. The ruled surface 14 of which generating lines pass through this closed curve 15 and also are parallel to the inner ones is the required outer surface of the conical or cylindrical pipe lens.

The structure of the bell shaped pipe lens of the present invention is composed of the transparent wall pipe whose outer surface 4 is given, if the inner surface 3 thereof is determined by Equation 1, by firstly determining the quarter surface with the aid of Equations 2 or 2', 1, 3, 4, 5 and 6, and then symmetrically projecting it twice to X-Z and Y-Z planes, respectively. As the special case of the bell shaped pipe lens, the outer surface 14 of the conical or cylindrical pipe lens is given by the ruled surface whose generating lines pass through the closed curve 15 and parallel to the ones of the inner surface 13, where the inner surface 13 is given by Equations 1 and 1-a, and the closed curve 15 is a resulting one by projecting the quarter curve, given by Equations 3-a, 4-a, 5-a, 5'-a, and 7, twice around X-axis and Y-axis at $Z=Z_0$ plane.

The performance of the present invention is stated in the following. As is described hereinbefore in details, and is shown schematically in FIG. 4 in cross section, the incoming parallel light rays parallel to X-axis will be refracted twice on the outer and inner surfaces of the lens wall 1 and traverse parallel through the bore and also emerge parallel to X-axis after refracting twice on the inner and outer surfaces of the lens wall 1, respectively. The optical observation of phenomena in bell shaped or conical or cylindrical pipe becomes possible for exact analysis by the present invention.

THE EXAMPLE AND THE TESTED PERFORMANCE OF THE PRESENT INVENTION

Figure 7:
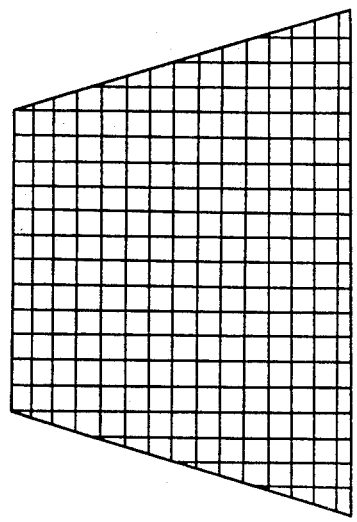
FIG. 7 shows a 2 mm. square grid shaped trapezoid which may just slide into the conical pipe of FIG. 5 along its longitudinal cross sectional plane and which is used for the performance test of the conical lens shown in FIG. 5.
Figure 8:
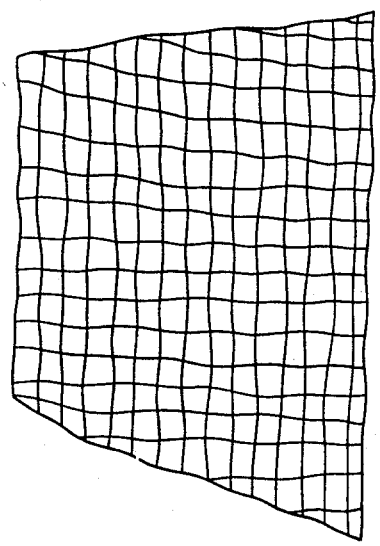
FIG. 8 shows the projected image of the trapezoidal grid through the conical lens of FIG. 5 by projecting parallel light rays.

A conical pipe lens of which half cone angle being 15° was machined and polished according to the design criteria formulated in this specification. The maximum inner bore was 41.14 mm., the axial length 31.98 mm., the refractive index $n=1.48698$ (5780 A.), the transparent material was acrylic and $\delta_0$ was 10 mm. A 2 mm. square grid shaped trapezoid as shown in FIG. 7 was slided into the conical pipe lens just on the Y-Z plane, and the parallel light rays along X-axis were projected into the lens. The obtained projected image was as shown in FIG. 8. The distortion in FIG. 8 includes both machining error and the proper distortion.

The proper distortion shown in FIG. 8 is still in parallel deformed, and may be eliminated by using another half pipe lens as compensation. If it is considered that FIG. 7 and FIG. 8 represent the object coordinates in the pipe and the image coordinates (projected by parallel light rays) including machining error, respectively, FIG. 7 and FIG. 8 can be used for calibration by which the image taken of an object in the pipe may be adjusted to transform into the original coordinates not affected by distortion due to machining defects. The stated method can be generally applied to bell shaped pipe lens also.

As is stated in the foregoings, the Schlieren or shadow graph of phenomena in the bell shaped, or conical, or cylindrical pipe can be taken for exact analysis by using the present invention.

The present invention is useful for optical studies of fluids in rocket bell shaped nozzle, conical nozzle, and circular wind tunnel.

What is claimed is:

1. A pipe lens comprising a transparent wall, an inner surface of revolution and an outer surface having a specific relationship to the inner surface, the inner and outer surfaces defining the transparent wall, wherein the inner surface is given by the following Equation 1, and the quarter of the outer surface is given by the following Equations 1, 2, 3, 4, 5 and 6, respectively, and the required surface is obtained by symmetrically projecting twice the quarter outer surface to the X-Z, and Y-Z planes, respectively, so that incoming light rays perpendicular to the axis of rotation refract at the outer and inner surfaces of the lens, respectively, cancelling the refraction to each other, so as to pass through the bore parallel to said incoming light rays, and then refract again twice at the inner surface and outer surface, respectively, cancelling the refraction to each other so as to leave the lens parallel to the incoming light rays, whereby the phenomena in the pipe is projected substantially parallel by the parallel light rays passing through the pipe lens:

(1) $\quad \xi(x, y, z):$
$$x=f(t) \cos \theta$$
$$y=f(t) \sin \theta$$
$$z=t$$

(2) $\quad \Xi(\theta,t) = \xi(\theta,t) + \delta(\theta,t) \cdot \gamma_1(\theta,t)$ (2') $\quad X(\theta,t) = f(t) \cos \theta + \delta(\theta,t) \cdot l(\theta,t)$
$\quad\quad Y(\theta t) = f(t) \sin \theta + \delta(\theta,t) \cdot m(\theta,t)$
$\quad\quad Z(\theta,t) = t + \delta(\theta,t) \cdot n(\theta,t)$ (3) $\quad \gamma', (l, m, n):$ $$l = \frac{\cos\theta \cos\theta_B + \sin\theta_B (\dot{f}(t)^2 + \sin^2\theta)^{1/2}}{(1+\dot{f}(t)^2)^{1/2}}$$

$$m = \frac{(\dot{f}(t)^2 + \sin^2\theta)^{1/2} \cos\theta_B - \cos\theta \sin\theta_B}{\{(1+\dot{f}(t)^2)\cdot(\dot{f}(t)^2+\sin^2\theta)\}^{1/2}} \cdot \sin\theta$$

$$n = -\frac{(\dot{f}(t)^2+\sin^2\theta)^{1/2}\cos\theta_B - \cos\theta\sin\theta_B}{\{(1+\dot{f}(t)^2)\cdot(\dot{f}(t)^2+\sin^2\theta)\}^{1/2}} \dot{f}(t)$$

(4) $\quad \theta_B = \arccos\left[\frac{1}{n\lambda}\left\{\frac{(n\lambda^2-1)(1+\dot{f}(t)^2)+\cos^2\theta}{1+\dot{f}(t)^2}\right\}^{1/2}\right]$ (5) $\quad \begin{cases} \dfrac{\partial\delta}{\partial\theta} = -\delta\dfrac{[\xi]_N \cdot \dfrac{\partial\gamma_1}{\partial\theta}}{[\xi]_N \cdot \gamma_1} \\ \dfrac{\partial\delta}{\partial t} = -\delta\dfrac{[\xi]_N \cdot \dfrac{\partial\gamma_1}{\partial t}}{[\xi]_N \cdot \gamma_1} \\ 0 \leq \theta \leq \dfrac{\pi}{2} \end{cases}$ (6) $\quad \xi_n : \begin{cases} \dfrac{\cos\theta}{(1+\dot{f}(t)^2)^{1/2}} \\ \dfrac{\sin\theta}{(1+\dot{f}(t)^2)^{1/2}} \\ \dfrac{-\dot{f}(t)}{(1+\dot{f}(t)^2)^{1/2}} \end{cases}$ where $\xi$ expresses the position vector of the inner surface, $x, y, z$ the rectangular coordinates for the inner surface, $f(t)$ the continuous function of $t$ and also the inner radius at $z=t$, $\theta$ and $t$ the curvilinear coordinates of the inner surface; $\theta$ being the radical angle and $t$ the distance on the Z-axis of the inner surface; $\Xi$ the position vector of the outer surface; $X, Y, Z$ the rectangular coordinates for the outer surface; $\gamma$ the unit vector of the refracted light ray passing through the pipe wall; $l, m,$ and $n$ are components of $\gamma$; $n\lambda$ the refractive index of the transparent material for the light wave length $\lambda$; $\delta$ the distance of the path of light ray vector $\gamma$ between the outer and the inner surface; $[\xi]_n$ the unit normal vector of the inner surface $\xi$; $\dot{f}(t)$ denotes $df/dt$; and $l, m, n$ the direction cosines in the $x, y$ and $z$ direction of $\delta$; the thickness of the lens wall, calculated from above equations (1), (2) and (2'), decreasing as $\theta$ increases from 0 to 90 degrees.

2. A pipe lens according to claim 1, wherein the inner surface when conical is given by the equation (1-a) $$f(t) = r_0 - t \cdot \tan \alpha$$

where $\alpha$ is half the cone angle of the inner surface, and when $\alpha = 0$ the equation expresses a cylindrical surface.

3. A pipe lens according to claim 2, wherein the quarter of the outer surface is given by the following Equations 1-a, 2, 2'-a, 3-a, 4-a, 5-a, 5'-a and 7 and the resulting surface is symmetrically projected twice with respect to the X–Z and Y–Z planes, respectively, to obtain the required surface:

(1-a) $$f(t) = r_0 - t \cdot \tan \alpha$$

(2) $$\Xi(\theta, t) = \xi(\theta, t) + \delta(\theta, t) \cdot \gamma_1(\theta, t)$$

(2'-a)
$$X = (r_0 - t \cdot \tan \alpha) \cos \theta + \delta(\theta) \cdot l(\theta)$$
$$Y = (r_0 - t \cdot \tan \alpha) \sin \theta + \delta(\theta) \cdot m(\theta)$$
$$Z = t + \delta(\theta) \cdot n(\theta)$$

(3-a)
$$l = \cos \alpha \cos \theta \cos \theta_B + (1 - \cos^2 \alpha \cos^2 \theta) \left\{ \frac{1 - \cos^2 \theta_B}{1 - \cos^2 \alpha \cos^2 \theta} \right\}^{1/2}$$

$$m = \cos^2 \alpha \sin \theta \cos \theta \left[ \frac{\cos \theta_B}{\cos \alpha \cos \theta} - \left\{ \frac{1 - \cos^2 \theta_B}{1 - \cos^2 \alpha \cos^2 \theta} \right\}^{1/2} \right]$$

$$n = \sin \alpha \cos \alpha \cos \theta \left[ \frac{\cos \theta_B}{\cos \alpha \cos \theta} - \left\{ \frac{1 - \cos^2 \theta_B}{1 - \cos^2 \alpha \cos^2 \theta} \right\}^{1/2} \right]$$

(4-a) $$\theta_B = \arccos \left\{ \frac{1}{n\lambda} (n\lambda^2 - 1 + \cos^2 \alpha \cos^2 \theta)^{1/2} \right\}$$

(5-a)
$$\frac{\delta}{\delta_0} = \frac{l_0 + n_0 \tan \alpha}{l \cos \theta + m \sin \theta + n \tan \alpha} \exp \left\{ - \int_0^\theta \frac{l \sin \theta - m \cos \theta}{l \cos \theta + m \sin \theta + n \tan \alpha} d\theta \right\}$$

(5'-a)
$$l_0 = \frac{\sin^2 \alpha}{n\lambda} + \cos \alpha \left( 1 - \frac{\sin^2 \alpha}{n\lambda^2} \right)^{1/2}$$

$$n_0 = \sin \alpha \left\{ \left( 1 - \frac{\sin^2 \alpha}{n\lambda^2} \right)^{1/2} - \frac{\cos \alpha}{n\lambda} \right\}$$

(7)
$$X = (r_0 - u_0 \cdot \tan \alpha) \cos \theta + (l + n \tan \alpha \cos \theta) \delta$$
$$Y = (r_0 - u_0 \cdot \tan \alpha) \sin \theta + (m + n \cdot \tan \alpha \sin \theta) \delta$$

References Cited

UNITED STATES PATENTS 2,980,802  4/1961  Bracey et al. _____ 350—190 X
3,310,358  3/1967  Marcatili _____ 350—189

JOHN K. CORBIN, Primary Examiner

U.S. Cl. X.R.

356—246